F. G. & W. F. NIEDRINGHAUS.
LIPS AND STRAINERS.

No. 190,155. Patented May 1, 1877.

ATTEST.
Paul Bakewell
Saml. V. Boyd

INVENTORS.
Frederick G. Niedringhaus.
William F. Niedringhaus.
by Chas. D. Moody,
their atty.

UNITED STATES PATENT OFFICE.

FREDERICK G. NIEDRINGHAUS AND WILLIAM F. NIEDRINGHAUS, OF ST. LOUIS, MISSOURI.

IMPROVEMENT IN LIPS AND STRAINERS.

Specification forming part of Letters Patent No. 190,155, dated May 1, 1877; application filed April 2, 1877.

*To all whom it may concern:*

Be it known that we, FREDERICK G. NIEDRINGHAUS and WILLIAM F. NIEDRINGHAUS, residents of St. Louis, Missouri, have made a new and useful Improvement in Lips and Strainers, of which the following is a full, clear, and exact description, reference being had to the annexed drawing, making part of this specification, in which—

Figure 1:
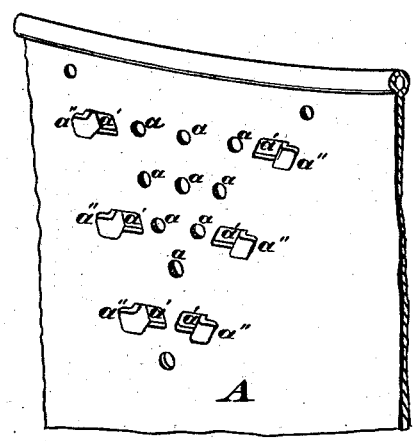
Figure 2:
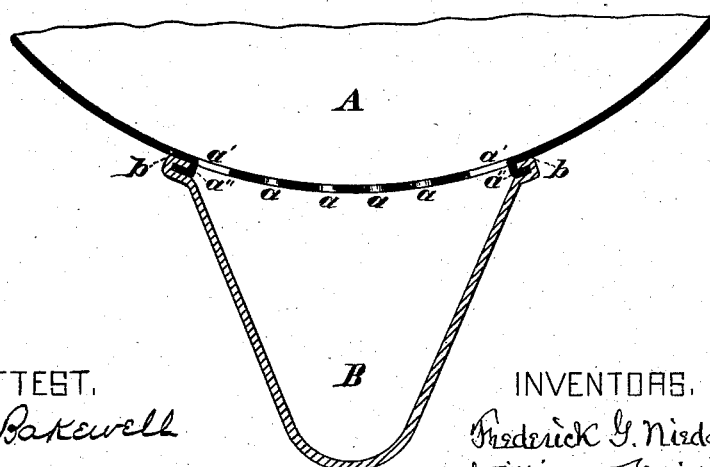

Figure 1 is a perspective, showing the upper portion of a vessel. It is perforated to form the strainer and to receive the lip. Fig. 2 is a horizontal section of the vessel and lip in position.

Like letters refer to like parts.

Our improvement is adaptable to other kinds of vessels, but is intended more especially for vessels composed of enameled sheet-iron ware. By means of it the strainer can be formed, and the lip attached, in a comparatively inexpensive manner. The construction is durable, and it presents a neat appearance.

Referring to the annexed drawing, A represents the body of a vessel, such as a coffee-boiler. It has a series of perforations, $a\ a$, forming the central part of the strainer, and from which, in their formation, the metal is entirely removed in the ordinary manner. It also has another set of perforations, $a'\ a'$, that form the outer part of the strainer, and from which the metal is but partly cut away, as shown more distinctly in Fig. 1. These last-named perforations $a'\ a'$ are arranged at either side of the central perforations $a\ a$, and they are made so that the metal $a''\ a''$, remaining attached to them, can be turned (at each side, respectively, of the strainer) outwardly, and so as to form a series of flanges. B represents the tip. It is of the usual shape, having a flange, $b\ b$, which, when the lip is attached, comes beneath the flanges $a''\ a''$. The lip is then fastened in place by closing the flanges $b\ b$ and $a''\ a''$ down upon the body A, and the joint is made tight by an enamel covering. To strengthen the attachment, three rivets are inserted at the corners, respectively, of the base of the lip.

What we claim is—

The combination of the body A, having the perforations $a\ a$ and $a'\ a'$, and the flanges $a''\ a''$, and the lip B, having the flanges $b\ b$, substantially as described.

F. G. NIEDRINGHAUS.
WM. F. NIEDRINGHAUS.

Witnesses:
CHAS. D. MOODY,
SAML. S. BOYD.